United States Patent [19]
Nickel

[11] 3,905,045
[45] Sept. 9, 1975

[54] APPARATUS FOR IMAGE PROCESSING

[75] Inventor: Donald Francis Nickel, Bloomington, Minn.

[73] Assignee: Control Data Corporation, Minneapolis, Minn.

[22] Filed: June 29, 1973

[21] Appl. No.: 375,301

[52] U.S. Cl. .......................... 444/1; 250/558; 356/2

[51] Int. Cl.² ................ G06F 15/06; G06F 15/42; G03B 41/16

[58] Field of Search ................ 444/1; 235/150, 181; 178/DIG. 5, 6.5; 356/2, 72, 157, 158, 163, 167, 203, 205, 206, 256; 353/5, 30, 121, 122; 250/217 CR, 220 SP; 340/172.5

[56] References Cited

UNITED STATES PATENTS

| | | | |
|---|---|---|---|
| 2,989,890 | 6/1961 | Dressler | 353/5 X |
| 3,212,397 | 10/1965 | Miller | 353/122 X |
| 3,283,071 | 11/1966 | Rose et al. | 178/6.8 |
| 3,432,674 | 3/1969 | Hobrough | 250/220 SP |
| 3,535,443 | 10/1970 | Rieke | 178/6.8 |
| 3,564,133 | 2/1971 | Hobrough | 356/2 X |
| 3,582,651 | 6/1971 | Siedband | 178/6.8 UX |
| 3,597,083 | 8/1971 | Fraser | 356/2 |
| 3,627,918 | 12/1971 | Redpath | 178/6.8 |
| 3,636,254 | 1/1972 | Johnston | 356/2 X |
| 3,748,644 | 7/1973 | Tisdale | 178/6.8 X |

OTHER PUBLICATIONS

Appel et al., Def. Pub. of Serial No. 267,801 filed 6/30/72; T912,012.

Images from Computers; M. R. Schroeder; IEEE Spectrum; March, 1969; pp. 66–78.

*Primary Examiner*—Edward J. Wise
*Attorney, Agent, or Firm*—William J. McGinnis, Jr.

[57] ABSTRACT

A special purpose pipeline digital computer is disclosed for processing a pair of related, digitally encoded, images to produce a difference image showing any dissimilarities between the first image and the second image. The computer is comprised of a number of special purpose pipeline processors linked to a supervisory general purpose processor. First, a initial image warp transformation is computed by a spatial transformation pipeline processor using a plurality of operator selected, feature related, match points on the pair of images, and then, image correlation is performed by a dot product processor working with a square root and divide processor to identify the exact matching location of a second group matching points selected in a geometrical pattern, on the pair of images. The final image warp transformation to achieve image registration occurs in the spatial transformation processor, using a localized polylateral technique having the geometrically selected match points as the vertrices of the polylaterals. Finally, photoequalization is performed and the difference image is generated from the pair of registered images by a photoequalization processor.

6 Claims, 12 Drawing Figures

SQUARE ROOT AND DIVIDE PROCESSOR

APPARATUS FOR IMAGE PROCESSING

CROSS REFERENCE TO RELATED APPLICATIONS

This application is related to apparatus for performing methods disclosed and claimed in several previously filed patent applications assigned to the same assignee as this application. These patent applications are related to the present application and the entire contents thereof are hereby incorporated by reference:

Docket 400, Image Correlation Method for Radiographs, Ser. No. 327,256, filed Jan. 29, 1973; now abandoned;

Docket 401, Change Detection Method for Radiographs, Ser. No. 331,901, filed Feb. 12, 1973; now abandoned;

Docket 402, Feature Negation Change Detection Method for Radiographs, Ser. No. 327,530, filed Jan. 29, 1973; now abandoned;

Docket 437, Point Slope Method of Image Registration, Ser. No. 336,675, filed Feb. 28, 1973; now abandoned;

Docket 439, Polylateral Method of Obtaining Registration of Features In a Pair of Images, Ser. No. 336,660, filed Feb. 28, 1973; now abandoned;

Docket 443, Method of Image Gray Scale Encoding for Change Detection, Ser. No. 348,778, filed Apr. 6, 1973; now abandoned; and Docket 447, Detection Method for a Pair of Images, Ser. No. 353,877, filed Apr. 23, 1973.

BACKGROUND OF THE INVENTION

The seven cross-referenced patent applications provide substantial detail and exposure to the image processing art as related to the present invention. These applications describe embodiments of inventions dealing with image processing, such as radiographs, and more particularly chest radiographs. However, the scope of those inventions is such as to apply to all types of images which may be processed for production of a difference image showing differences, only, between a first and second image.

The present application is a description of an apparatus for performing difference image processing and it assumes a knowledge of the cross-referenced and incorporated, applications and the variations of the methods disclosed therein. However, the present apparatus is not confined in scope to radiographic image processing but may be used with any type of difference image processing.

SUMMARY OF THE INVENTION

The present invention is a special purpose digital computer comprising several special purpose pipeline processors and a supervisory processor for processing images to produce a difference image representative of changes between a pair of related given images which have unknown differences between them. The method and techniques employed by this apparatus in performing its functions are thoroughly described in the cross-referenced and incorporated co-pending applications and so therefore the description of the method for which the apparatus is designed will not be discussed in great detail.

The special purpose computing device of the present invention includes a general purpose supervisory computer conventionally programmed for among other things, the transfer of data among the various pipeline processors and peripheral units in this system. As will be described below, the special purpose processors are assigned individual functions generally corresponding to steps in the method of image processing described in the co-pending applications.

IN THE FIGURES

DESCRIPTION OF THE PREFERRED EMBODIMENT

The method of producing a difference image employed by the apparatus of the present invention is derived from the methods disclosed in the cross-referenced patent applications. The present method will be briefly described in connection with FIGS. 1A and 1B through 3A and 3B but reliance will nevertheless be made on the cross-referenced and incorporated applications for a more detailed disclosure of method techniques.

Initially, a plurality of match points corresponding to identical features on images A and B are selected by an operator or image interpretor and the coordinates of each such point are determined with respect to reference axes for each image. The number of match point pairs may be in the range from at least four pairs to as many as, for example, 25 pairs. Then, where $X_i$, $Y_j$ are the coordinates of points on image A and where $U_i$, $V_j$ are coordinates of points on image B, an initial map warp polynomial is determined, using a least squares method for determining polynomial coefficients where more information on match points is determined than the number of unknown polynomial coefficients. These polynomial equations may be used to perform an initial image warp on image B based only on the manually identified match points or they may be used to calculate map warp only for specific points or regions of interest. These equations take the form:

$$U=A_0 + A_1X + A_2Y + A_3XY +$$

and $$V=B_0 + B_1X + B_2Y + B_3XY +$$

Figure 1A:
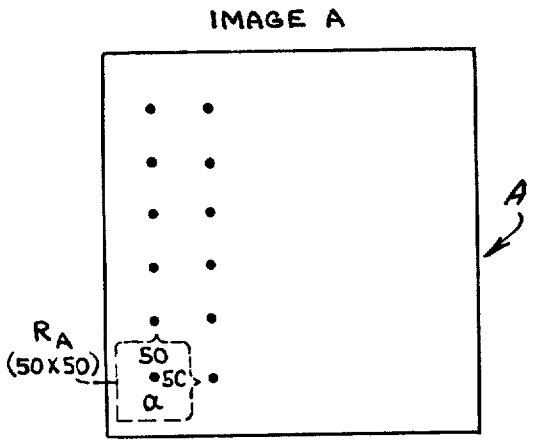
FIGS. 1A and 1B are diagrammatic showings of an A image and a B image respectively, to illustrate the processing method of the present apparatus.
Figure 1B:
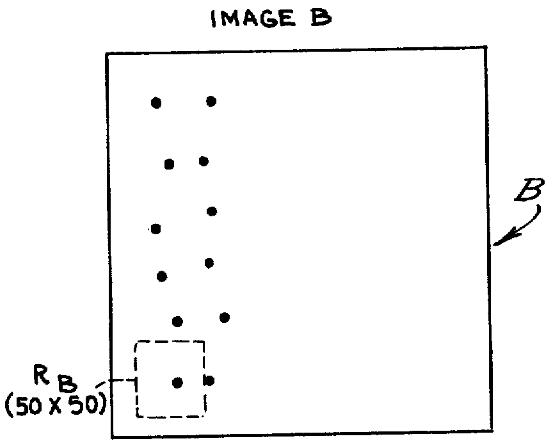

The next step of the method as performed by the present apparatus is that on image A, shown in FIG. 1A, and on image B, shown in FIG. 1B, a pair of columns of equally spaced, geometrically located, match points are defined on image A. From the known coordinates of the points defined on images A and B, polynomial map warp equations are determined from the manually selected match points. Then approximate match points are computed on image B using the polynomial map warp equations. These points are plotted or determined not necessarily in the sense that they are displayed to the viewer but that they are identified by the computer for the purpose of further computation. The illustration of image B in FIG. 1B is for illustrative purposes to show the location of points plotted according to the map warp equations. As shown in FIG. 1A and 1B, for purposes of illustration, two columns of match points are defined starting at the left hand side of the image, each column having six points.

Next, one pair of match points is selected on the images at a logical starting point for the image warp process, such as the lower left hand corner as shown in FIGS. 1A and 1B. For purposes of illustration, an array of points 50 by 50 picture cells square is selected about the match point taken as the center in the lower left hand corner of image A. A same sized 50 × 50 array is selected about the geometrically equivalent point in image B as shown in FIG. 1B. This geometric point on image B does not necessarily correspond as to the feature location and it is the object of image correlation to achieve geometric correspondence to feature location. Next, as described in substantial detail in cross referenced patent applications, the correlation coefficient is determined for the picture elements in the two initially selected arrays by mathematical analysis of the gray scale values of the picture cells in the array. Following the initial correlation coefficient calculation, the array on the B image is moved about, in an incremental fashion, to a plurality of alternate locations centered on other points than the initially geometrically determined location. For each of these alternate locations a correlation coefficient is also calculated to determine the degree of matching obtained with the picture cell array on the A image.

The position of the array on image B yielding the highest correlation coefficient determines the point at which the center of the array is closest to feature identity with the center of the equivalent array on image A.

These initial incremental movements of the 50 × 50 array are followed by incremental movements of another array which may be a 50 × 50 array also, about the point selected as having the highest correlation with the 50 × 50 array. The first array may be moved in increments of 6 picture cells to perhaps 36 different locations. The second array may be a 50 × 50 array moved in increments of one picture cell to 81 different locations.

For example, every sixth point in a 31 × 31 array is used as center for a 50 × 50 array during course search. The six points −15, −9, −3, +3, +9, +15 may be used for total of 6 × 6 = 36. Center $(a,b)$ of fine search is point of maximum correlation for course search. Fine search area centers a 50 × 50 array within $a \pm 4$, $b \pm 4$ giving 9 × 9 = 81 search points.

Interpolation between adjacent picture cell locations about the location of the highest correlation coefficient is used to more accurately locate the exact match point. Thereafter, the incremental movement of matching arrays is repeated for each pair of points in the first column on the images. And similarly, the process is repeated for the points in the second column so that exact match point locations are determined between the A and B images from the approximate match points originally selected.

Figure 2A:
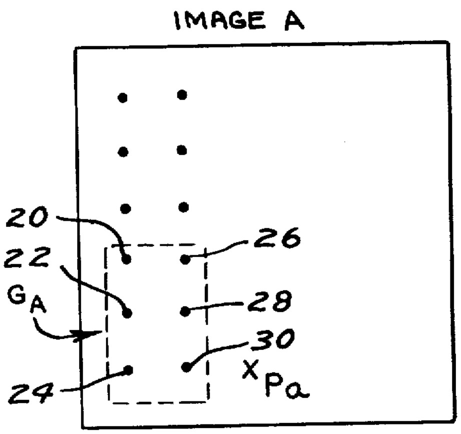
FIGS. 2A and 2B are diagrammatic showings of an A image and a B image respectively, showing a further step in the processing performed by the apparatus of the present invention.
Figure 2B:
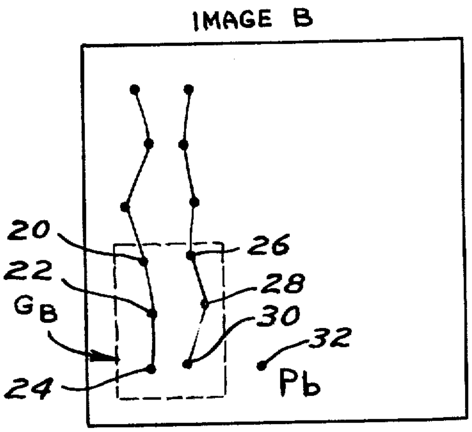

Referring now to FIGS. 2A and 2B, showing the A and B images at a further step in the image warp process, the first matching pair ($Pa$, $Pb$) in a third column on the images is formed by first determining the coefficients for a map warp polynomial using the now known, exact, matching pair locations in the first two columns which are the nearest neighbors to the first unknown pair in the third column. Thus, as shown in FIGS. 2A and 2B, the six point pairs 20, 22, 24, 26, 28 and 30 may be used to determine the approximate location of point 32. Thereafter, point 32 is used as a center point of a search area for determining the exact location of the highest correlation coefficient by the array searching method. In this fashion, estimated match points for all points in the third column are derived using matching pairs from columns one and two. Finally, estimated match points for each column, through column N + 1, are derived using match points from columns N and N−1. Actual match points for the third column and each successive column are derived by determining the array location having the highest correlation coefficient and using an interpolation method if the determined location does not correspond to the coordinates of a picture cell.

Figure 3A:
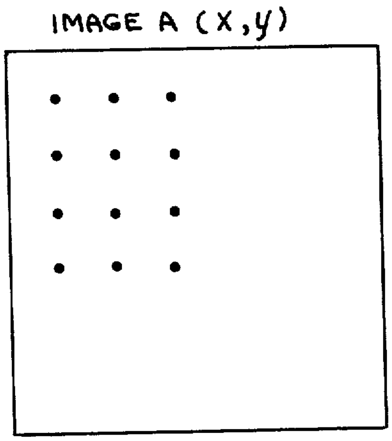
FIGS. 3A and 3B are still further illustrations of an A image and a B image, respectively, showing an additional processing step using the apparatus of the present method.
Figure 3B:
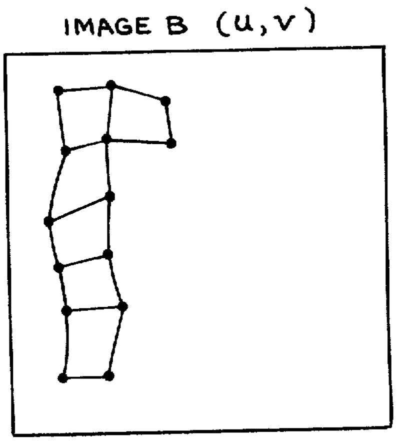

Referring now to FIGS. 3A and 3B, after all columns of match points are determined exactly by the correlation process, a plurality of quadilateral figures are determined on image B with four match points serving as the corners of each one thereof. As described in the copending, cross referenced, patent applications, each quadrilateral is transformed internally according to the transformation equations:

$$U = a + bX + cY + dXY \text{ and } V = e + fX + gY + hXY$$

having 8 unknowns which may be solved using the four match point pairs each having an ordinant and coordinant location. Points in image B internal to a given quadrilateral which match with a given point in the A image internal to the corresponding square quadrilateral in image A may be computed directly from the transformation equation. However, computed match points in B do not necessarily have integral values. Therefore, the intensity at a non-integral match point in B may be determined by interpolation from the four corresponding nearest neighbor integral match points in image B.

The photo normalization and difference image production process with the present apparatus is substantially identical to the methods disclosed in the copending applications.

Figure 4:
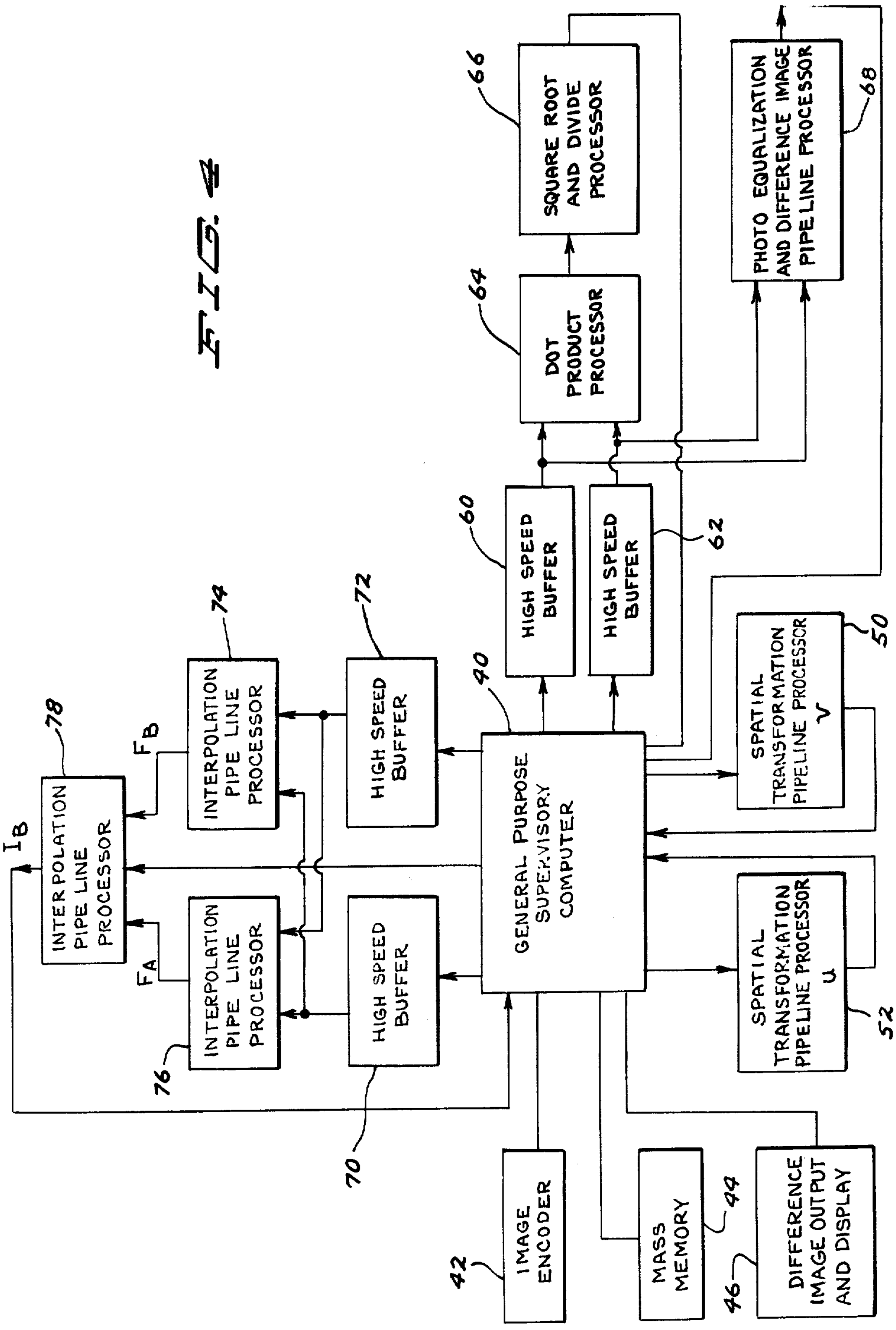
FIG. 4 is a block diagram of the special purpose computer according to the present invention.

Referring now to FIG. 4, a general purpose supervisory computer 40 receives the digital information from an image encoder 42 and controls the processing steps through several special purpose pipeline processors which will be explained below. Computer 40 also handles requests for and supplies information to a mass memory device 44 in connection with the output of the image encoder, the various special purpose pipeline processors, and the final difference image output from the system. The difference image output goes to an output and display device 46 which may be a cathode ray tube type of display which produces an analog image from digital data or a hard copy plotting device. One example of a suitable general purpose supervisory computer 40 is a Control Data Corporation 1700 series computer, or any equivalent or more sophisticated general purpose computer manufactured by Control Data Corporation or by other manufacturers.

Figure 9:
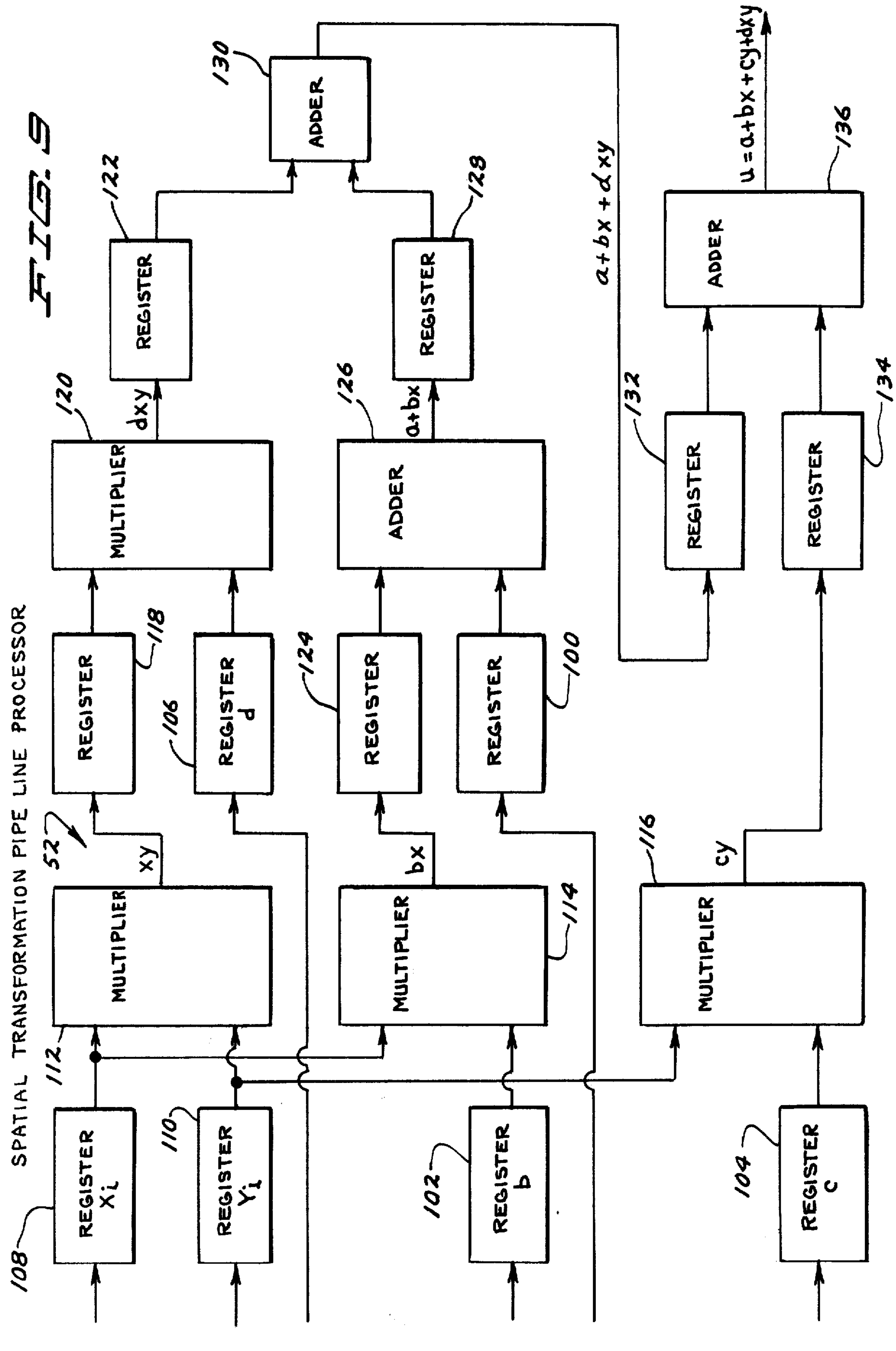
FIG. 9 is a block diagram of a final one of the special purpose processors shown in FIG. 4.

Associated with the supervisory computer 40 are two identical spatial transformation pipeline processors, 50 and 52, which perform the initial map warp transformation on the U and V axis in the B image from the initially, manually, measured coordinates. The spatial transformation pipeline processors each produce warp calculations for the B image using coefficients which have been calculated by computer 40 from the match point positions. One of the spatial pipeline processors is shown in FIG. 9 and will be discussed in greater detail below.

A pair of high speed buffers 60 and 62 serve a dual function. When correlation coefficients are being calculated, in order to determine the exact match points, the buffers serve as a data buffer with the general purpose supervisory computer. When photoequalization transformation are being calculated, the high speed buffers 60 and 62 also operate with the photoequalization pipeline processor. Correlation coefficients are calculated by a pair of pipeline processors the first of which is a dot product processor 64 which will be described in detail in connection with FIG. 5 and a square root and divide processor 66 which will be described in detail in connection with FIG. 6. The photoequalization and difference image processor 68 will be described in detail in connection with FIG. 7.

Another pair of high speed buffers 70 and 72 connect the general purpose supervisory computer 40 with a system of interpolation pipeline processors 74, 76 and 78, which determine the gray scale levels for the warped picture cell locations as calculated in the spatial transformation pipeline processors. Also, during the warping process for the B image, the statistics of image B namely the average intensity values and means deviations are accumulated for the photonormalization processor by the general purpose supervisory computer. The three interpolation pipeline processors 74, 76 and 78 are all identified and are described in detail in connection with FIG. 8. Essentially, the interpolation process will be performed on every picture cell in image B during the image warp process.

The typical case is that a given transformed picture cell will be centered on a point in a square bounded by sides interconnecting four nearest neighbor picture cells. Thus, an interpolation must be performed for the U,V location of the tranformed picture cell location with respect to the vertical axis and with respect to the horizontal axis using all four corner picture cells. Pipeline processor 74 may interpolate the gray scale value and determine an integral gray scale value for the location between left side picture cells while pipeline processor 76 determines an interpolated gray scale value for the location between the right side picture cells. Pipeline processor 78 performs the required interpolation between the two interpolated values calculated by processors 74 and 76 to determine the gray scale value at the location of the new picture cell. That is, processors 74 and 76 have interpolated the gray scale values along the vertical sides of a square and processor 78 thereafter interpolates a value within the boundaries of this square extending horizontally between the boundary points for which the previous values were determined. Of course there are other simple and equivalent ways of interpolating to determine the gray scale values in the interior of a square. Essentially, the processors 74, 76, 78 would be used regardless of the exact method employed.

Referring now to FIG. 9 the spatial tranformation pipeline processors 50 and 52 which are shown in FIG. 4, are essentially identical so therefore only spatial transformation processor 52 is shown in detail in FIG. 9. The supervisory computer 40 provides as input to the spatial transformation pipeline processors 50 and 52 values for the polynomial coefficients a, b, c and d in the case of processor 52 and coefficients e, f, g and h in the case of processor 50. These coefficients are input into registers 100, 102, 104 and 106, as shown in FIG. 9. These registers hold the coefficient values during the entire spatial transformation process so that these coefficient values are used on each X and Y picture cell value which is fed into the processor in a pipeline fashion. Initial operands enter registers 108 and 110 from the mass memory 44, through the general purpose processor 40. Initially multiply operations are performed in multipliers 112, 114 and 116, used for various elements of the transformation expression. Multiplier 112 forms the XY product. Multiplier 114 forms the $bX$ product and multiplier 116 performs the $cY$ product. Register 118 receives the XY product from multiplier 112 and at an appropriate period in the timing cycle gates the XY product to multiplier 120 at the same time as register 106 gates the d coefficient to the same multiplier. The multiplier thereafter forms the $dXY$ term of the warp transformation equation which is then gated to register 122. In a somewhat similar fashion multiplier 114 gates the bX product to register 124 at the same time as the XY product is gated to register 118. Thereafter register 124 gates the $bX$ product to adder 126 simultaneously with the gating of the $a$ coefficient in the transformation equation from register 100 to the same adder. Adder 126 performs the $a+bX$ addition at the same time multiplier 120 performs the dXY multiplication. Thereafter the a+bX summation is entered into register 128 so that registers 128 and 122 are loaded simultaneously. Thereafter, contents of registers 122 and 128 are gated to adder 130 which forms the $a+bX+dXY$ summation which is entered into register 132. Meanwhile multiplier 116 has formed the cY product using the contents of registers 104 and registers 110 and gated the product to register 134. Thus, this operand must await the gating of the result operand to register 132 inasmuch as the result operand gated to register 132 takes longer to generate than the result of the multiplication occuring in multiplier 116. When the two results are available in registers 132 and 134 they are gated to adder 136 where finally the $a+bx+cY+dXY$ map warp transformation is produced. This transformation is then returned to the general purpose supervisory computer 40 as shown in FIG. 4. As previously stated the pipeline processor 50 is similar to the pipeline processor 52 just described in connection with FIG. 9.

Figure 5:
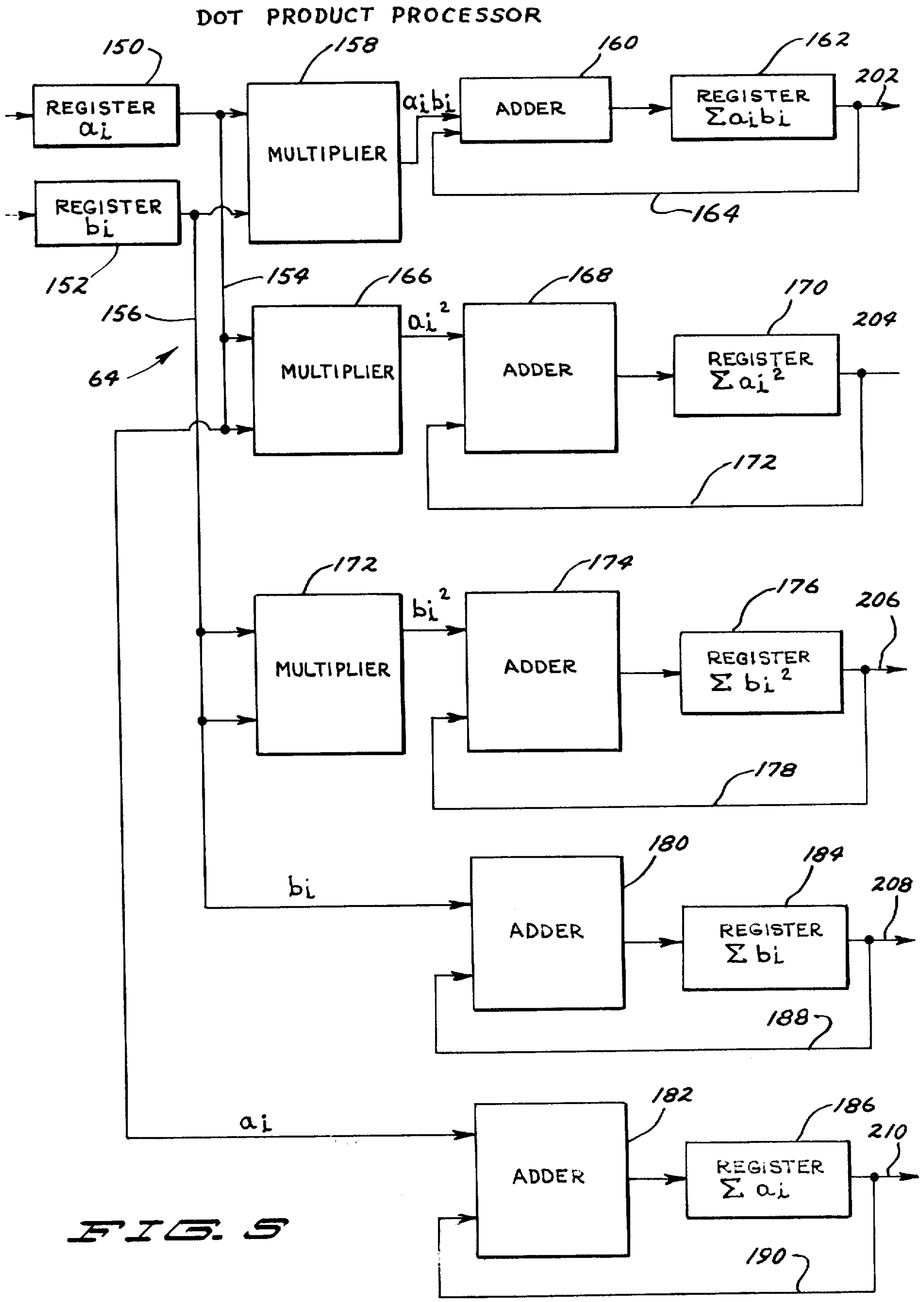
FIG. 5 is a block diagram of one of the special purpose processors shown in FIG. 4.

Referring now to FIG. 5, the dot product processor 64 is shown in detail. The correlation coefficient calculation requires an initial formulation of several individual products and squared values prior to the actual generation of the function. It is the purpose of the dot product processor to form the initial sums and squares used later in the square root and divide processor 66 to actually generate the correlation coefficient. Initially, the input operand values for the square arrays of picture cells are transferred from high speed buffers 60 and 62 to register 150 and 152 respectively. From these registers, the values of the a and b image gray scale values for the individual picture cells are transferred to A and B busses 154 and 156 respectively. Multiplier 158 forms the $a_ib_i$ product for each picture cell pair and transfers that result to adder 160. The results of adder 160 are gated to holding register 162 which holds the sum of all the $a_ib_i$ product terms as they accumulate. Loop path 164 illustrates that each successive cummulative total in the summation is looped back to adder 160 as another term is added to the summation. At the conclusion of the process, the register 162 holds the summation of all $a_ib_i$ product terms which will then be gated to the square root and divide processor 66. Similarly, multiplier 166 receives both its inputs from the $a_i$ buss 154 forming $a_i^2$ terms which are transmitted to adder 168. Register 170 cummulates the $a_i^2$ terms with a loop back 172 to adder 168 so that each new $a_i^2$ term can be added to the cummulative total. At the conclusion of the scanning of the individual array, the register 170 will hold the total summation of all $a_i^2$ terms.

In an identical fashion multiplier 172 operates with inputs exclusively from the $b_i$ buss 156 to form $b_i^2$ terms which are transmitted to adder 174. The $b_i^2$ terms are cummulated in register 176 and loop back 178 provides input to adder one-fourth of the current cummulative total to which the newest $b_i^2$ term is added. In a like fashion adders 180 and 182 cummulate $b_i$ and $a_i$ terms in connection with registers 184 and 186 and loop backs 188 and 190 to form, as indicated in FIG. 5, the summation of $b_i$ and $a_i$ terms respectively.

Figure 6:
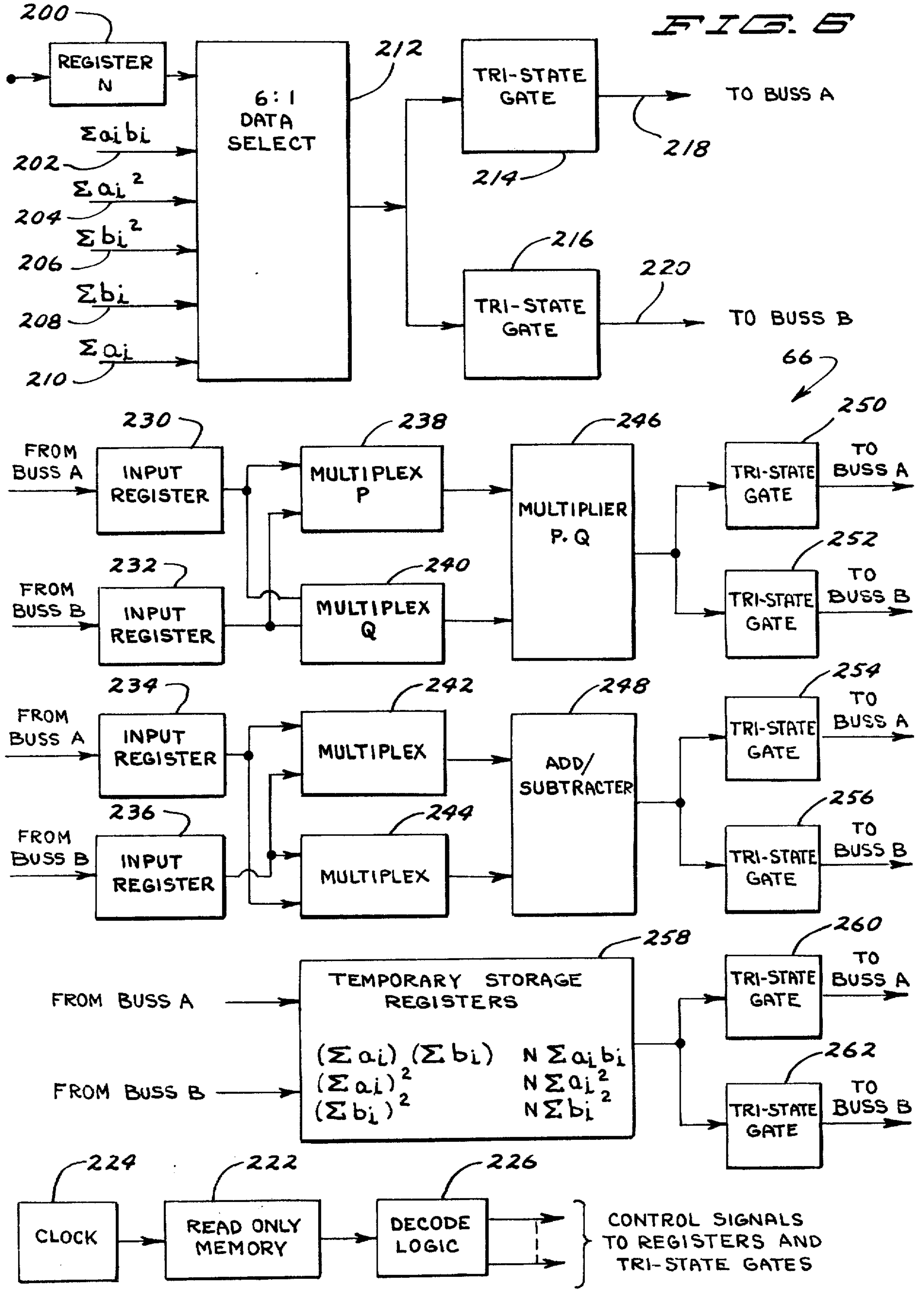
FIG. 6 is a block diagram of another special purpose processor shown in FIG. 4.

Referring now to FIG. 6, the square root and divide processor is shown which will complete the generation of the correlation coefficient function which was begun by the dot product processor 64. Initially, the general purpose supervisory computer enters the number N into register 200. The number N, of course, is the number of picture cells in the selected array for generation of the correlation coefficient. The other inputs from the dot product processor consists of the summation of the $a_ib_i$ terms on buss 202, the summation of the $a_i^2$ terms on buss 204, the summation of the $b_i^2$ terms on buss 206, the summation of the $b_i$ terms on buss 208, and the summation of the $a_i$ terms on buss 210. These 6 inputs are entered into a data selection and transfer network 212 which serves as an interface in the square root and divide processor. This data selection network has a single output to which is gated selectively any one of the 6 input quantities. The output of the data selection network is spanned out to two tri-state gates 214 and 216 which are associated with a selectively scanned buss 218 or a buss 220, respectively, depending upon control signals generated by a read only memory 222 which constitutes the control system of this processor. Read only memory 222 is associated with a clock 224 which controls the clock pulses within processor 66 and a decode logic network 226 which drives the registers and tri-state gates to be described in greater detail below in forming the correlation coefficient from the information generated in the dot product processor. The information selectively gated from the dot product processor to busses A and B are provided as indicated in FIG. 6 to a series of input registers 230, 232, 234 and 236 which are used to drive multiplex units, respectively, 238, 240, 242, and 244 as shown in FIG. 6. Input registers 230 and 232 and multiplex units 238 and 240 are associated with a multiply network 246.

Similarly, input registers 234 and 236 and multiplex units 242 and 244 are associated with add-subtract network 248. The output of networks 246 and 248 are each supplied to two tri-state gates one associated with buss A and the other associated with buss B. Associating multiply network 246 with buss A is tri-state gate 250. Associating multiply network 246 with buss B is tri-state gate 252. Associating add-subtract network 248 with buss A is tri-state 254. Associating add-subtract network 248 with buss B is tri-state 256.

As can be seen, operands are received from buss A, or buss B held in registers, and then transferred via multiplexers through the multiply or add-subtract networks back through a selected tri-state gate to buss A or buss B as required by the operation being performed. Similarly, the temporary storage register bank 258 receives information developed in add-subtract network 248, or in multiply network 246, and which has been put on buss A or buss B and holds this information for reinsertion through tri-state gates 260 and 262 back onto buss A or buss B, respectively, as required by the operation being performed. It will be appreciated that using conventional algorithms microprogrammed into the read only memory 222, the add-subtract networks 248 and the multiply network 246, together with the registers and busses, may be used to determine the square roots and dividend required to generate the correlation coefficient from the sums and products previously generated.

Figure 7:
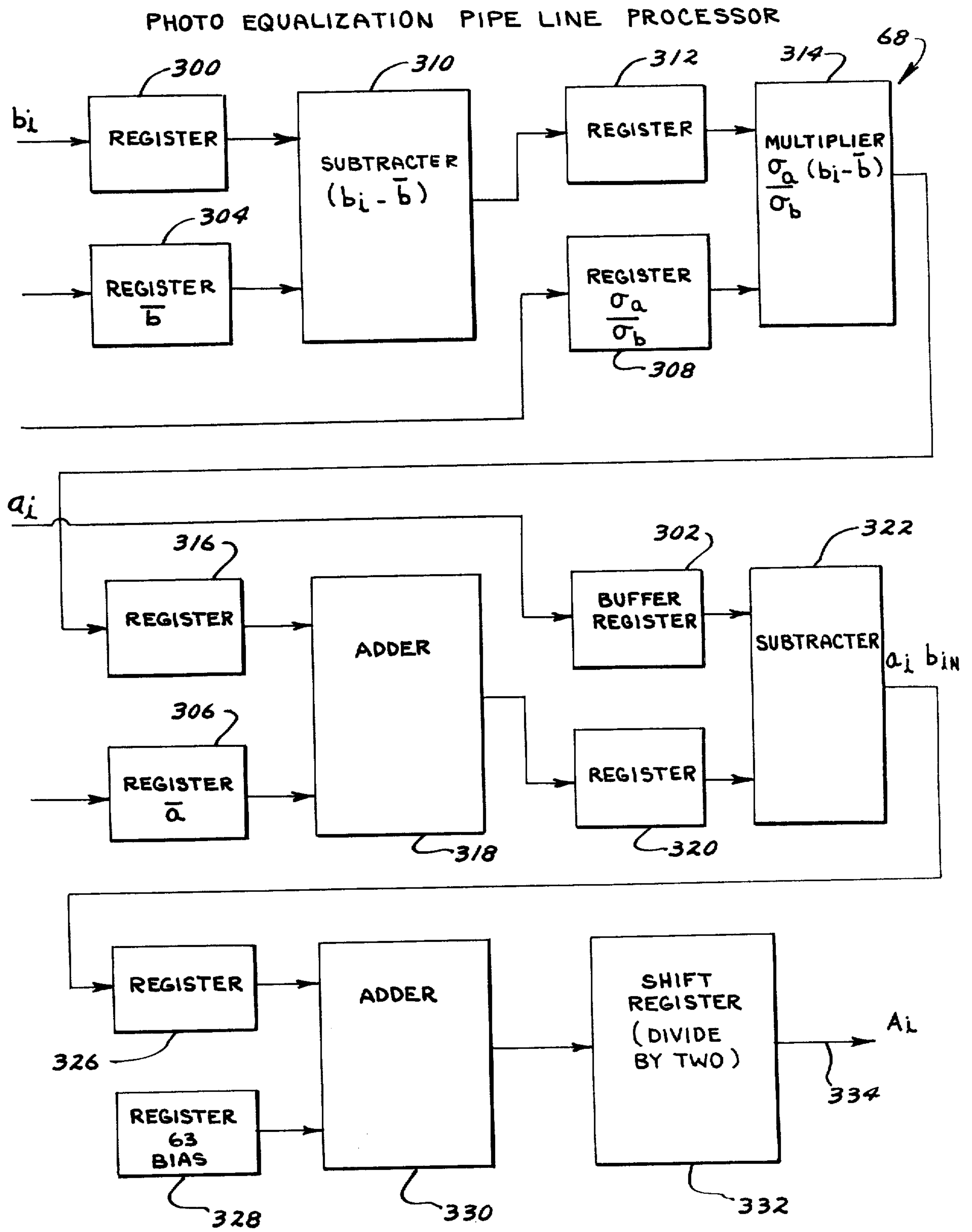
FIG. 7 is a block diagram of yet another of the special purpose processors shown in FIG. 4.

Referring now to FIG. 7, the photoequalization and difference image pipeline processor 68 is shown in detail. As has been previously indicated during this part of the difference image process this processor 68 is associated with high speed buffers 60 and 62 since the dot product processor 64 in the square root and divide processor 66 is not in use during the photoequalization process. The $b_i$ and $a_i$ picture cell values are entered serially into registers 300 and 302 in conventional serial pipeline fashion. Separately and independently the general purpose supervisory computer 40 has entered into registers 304 and 306 the average values of the picture cell gray scale quantities for the B and A images respectively which have been previously calculated as described in connection with processor 64 and 66. Also, the value of the fraction $\sigma_A/\sigma_B$ is entered into register 308 from the general purpose supervisory computer 40. Registers 300 and 304 are connected to subtract network 310 which forms the term $b_i - b$ for each picture cell of the B image. This term is transferred from subtract network 310 to register 312. The contents of register 308 are a constant for each image being processed and this constant is gated to multiply network 314 together with the contents of register 312 which contains the term for each picture cell of the B image as it is processed.

The result of this multiplication is transferred to register 316. An adder 318 adds the contents of register 306 and register 316 and transfers this further expanded term to register 320. Again the contents of register 306, consisting of the average picture cell value of image A, remains a constant for each image being processed and so the contents of register 316 may be stepped to adder 318 in serial pipeline sequence, as may be well understood. Subtract network 322 subtracts the contents of register 320 from register 302 for each picture cell in image B.

Buffer register 302 steps the $a_i$ input cell values so that the proper $a_i$ picture cell value is matched with the proper $b_i$ picture cell value. Of course it will be appreciated that a certain number of operational time cycles of delay must be allowed for buffer register 302 since the $a_i$ terms have no arithmetical applications performed thereon while the $b_i$ terms have several cycles of arithmetical operations performed on them. It should be appreciated that the contents of register 320 represent the normalized picture cell values for image B and may if desired be gated as an output of the processor so that the normalized B image may be displayed along with the original A image should this be of value to the interpreter of the image. The subtraction performed by subtract network 322 is the initial step in finding the difference image. The result of the subtraction performed by subtract network 322 is the difference between the gray scale values of picture cells of the A image and the normalized values of the B image and this is entered into register 326. Register 328 is initially programmed to contain an appropriate bias value of offset value so that the display image may be biased about a neutral tone of gray that is equidistant from pure white or pure black so that a completely bipolar tonal difference image may be presented. In the example under consideration we have assumed a range of 0–63 in coded levels and the desired mid-range value would therefore be a gray scale level of 32. The bias level in register 328 is added to the pure difference values stored in register 326 in add network 330. Thereafter the results from add network 330 are transferred to shift register 332 which is a simple way of performing binary division by two through a process of simply shifting all of the bits of an operand by one bit position. Thus, for each input value of $a_i$ and $b_i$ there emerges a $\Delta_i$ difference image gray scale picture cell value on buss 334 which may be returned to the general purpose processing computer 40 as indicated in FIG. 4 for presentation to the difference image and output display terminal 46.

Figure 8:
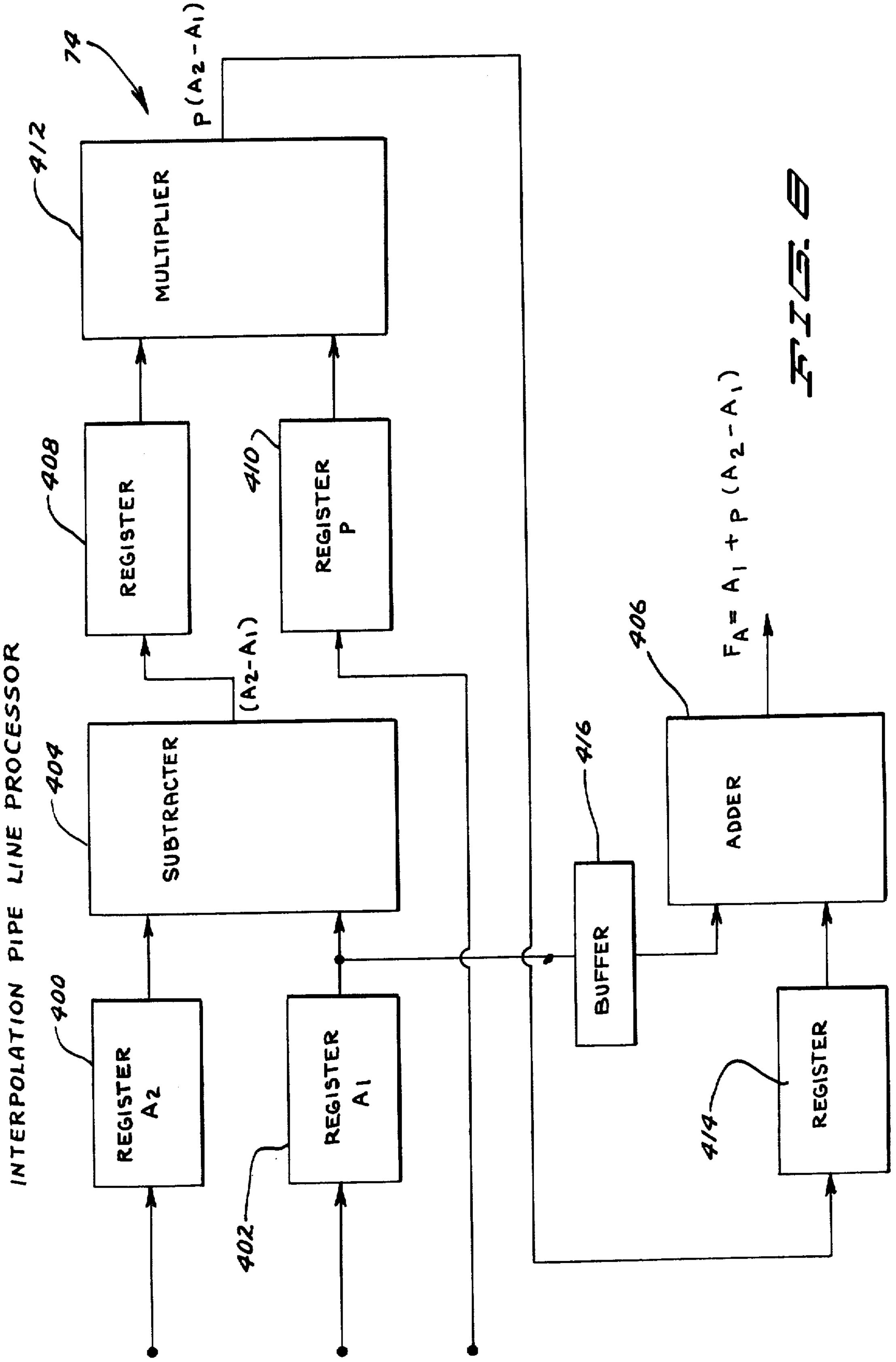
FIG. 8 is a block diagram of still another of the special purpose processors shown in FIG. 4.

FIG. 8 is a detailed showing of one of the interpolation pipeline processors (74) and since the others are alike as to structure they will not be shown in detail. The two picture cell valves between which the interpolation is to be performed are entered into registers 400 and 402. From these registers the operands are gated to a subtract network 404 in which a difference between the original values is determined and this determined value is transmitted to adder 406 for further operations which will be explained below. The result from subtract network 404 is gated to register 408. Previously, a proportionality of interpolation factor P has been calculated and determined by the general purpose supervisory computer and gated to register 410. The proportionality factor P is determined by the closeness of the calculated match points to the point taken as the base point in the interpolation. That is, the closer the calculated match point is to the point taken as the base point for the interpolation, the more closely the interpolated value should reflect the value of that match point. And of course the further the calculated match point location is from the base point location the more the interpolated value should reflect the value of the other interpolation point. Thus, this proportionality factor stored in register 410 is multiplied by the difference between the two interpolation point gray scale values held in register 408 in the multiply network 412. This quantity is then stored in register 414 where it is added in adder 406 to the base point gray scale value of the interpolation pair which originally was transmitted from register 402. Because of the time of transmittal through the pipeline consisting of the subtract and multiply networks and the registers, a buffer register 416 is interposed between register 402 and adder 406 so that the current $b_i$ values are matched with the correct difference values. As previously explained, the two interpolation pipeline processors 74 and 76 each produce an initial interpolation value and the third interpolation pipeline processor 78 interpolates between those first two interpolated values to determine the calculated match point gray scale value and the image warp equations.

It will, of course, be understood that various changes may be made in the form, details, and arrangement of the components without departing from the scope of the invention consisting of the matter set forth in the accompanying claims.

What is claimed is:

1. Apparatus for producing a difference image, by sequential operation of a plurality of elements, from related subjects represented on a first and a second image, wherein said first and second images are represented by digitally encoded values representative of gray scale values in a predetermined gray scale range for a plurality of picture cells into which each of said images is divided, said apparatus comprising:

a supervisory computer for controlling the flow of digitally encoded data representative of images during the operation of said apparatus, means connected with said supervisory computer for supplying encoded digital image data thereto representative of gray scale values on said first and second images, means connected with said supervisory computer for providing mass memory storage capability for use by the elements of said apparatus as the elements thereof perform image processing steps in sequential order, first and second spatial transformation processors, each connected to receive data from said supervisory computer and to transfer processed data to said supervisory computer, said data ultimately being retrieved from and returned to said means for providing a mass memory storage, said processors operating initially to perform an initial image warp transformation using operator selected match points on said first and second images, and which at a subsequent step in the sequence produces a final image warp transformation using data calculated in steps subsequent to said initial image warp transformation, a dot product processor connected to receive data from said supervisory computer, ultimately retrieved from said means for providing mass memory storage, said data resulting from said initial image warp transformation produced by said spatial transformation processors, a square root and divide processor connected to receive data from said dot product processor and to transfer processed data to said supervisory computer, said data being re-introduced to said spatial transformation processors for production of said final image warp transformation data, said dot product processor and square root and divide processors providing image correlation data for said spatial transformation processors for said final image warp transformation, a plurality of interpolation processors, connected to said supervisory computer, to receive data resulting from the final image warp transformation performed by said spatial transformation processors, said interpolation processors adapted to determine the gray scale values of transformed picture cells, at least one of said processors connected to receive data from said supervisory computer and at least one of said processors connected to transfer processed data to said supervisory computer, a photo equalization and difference image processor connected to receive data from said supervisory computer and to transfer processed data to said supervisory computer, said processor to receive the data resulting from the operation of said interpolation processors and to simultaneously photo equalize one of said images with the other of said images and to mathematically determine a difference in gray scale values between one of said images and the other of said images on a picture cell by picture basis wherein one of the images has undergone image warp transformation and photo equalization with respect to the other so that the two picture cells are equivalent in image detail to one another, and means connected with said supervisory computer for producing a difference image in operator usable form from the difference values produced by said photo equalization and difference image processor.

2. The apparatus of claim 1 and further comprising means for data buffering connected between said supervisory computer and said dot product processor.

3. The apparatus of claim 1 and further comprising means for data buffering connected between said supervisory computer and at least one of said interpolation processors.

4. Apparatus for producing a difference image by sequential operation of a plurality of elements from related subjects represented on a first and a second image, wherein said first and second images are represented by digitally encoded values representative of gray scale values in a predetermined gray scale range for a plurality of picture cells into which each of said images is divided, said apparatus comprising:

a supervisory computer for controlling the flow of digitally encoded data representative of images during the operation of said apparatus, means connected with said supervisory computer for supplying encoded digital image data thereto representative of gray scale values on said first and second images, means connected with said supervisory computer for providing mass memory capability for use by the elements of said apparatus as the elements thereof perform image processing steps in sequential order, processing means for spatially transforming at least one of said images to achieve registration with the other by assigning a transformed location on the registered image for each picture cell in the original image, and means connected to receive data from said supervisory computer and to transfer processed data to said supervisory computer, said data ultimately being retrieved from and returned to said means for providing a mass memory storage, said means operating initially to perform an initial image warp transformation using operator selected match points on said first and second images, and which, at a subsequent step in the sequence, produces a final image warp transformation using data supplied in steps subsequent to said initial warp transformation, a dot product processor connected to receive data from said supervisory computer, ultimately retrieved from said means for providing mass storage, said data resulting from said initial image warp transformation produced by said spatial transformation means, a square root and divide processor connected to receive data from said dot product processor and to transfer processed data to said supervisory computer, said data being re-introduced to said spatial transformation means for production of said final image warp transformation data, said dot product processor and square root and divide processors providing image correlation data for said spatial transformation means for said final image warp transformation, processing means for interpolating the gray scale values of picture cells transformed by said spatial transformation processing means connected to said supervisory computer, to receive data resulting from the final image warp transformation performed by said spatial transformation processing means, said means adapted to determine the gray scale values of transformed picture cells, said means connected to receive data from said supervisory computer and to transfer processed data to said supervisory computer, a photo equalization and difference image processor connected to receive data from said supervisory computer and to transfer processed data to said supervisory computer, said processor to receive the data resulting from the operation of said interpolation processing means and to simultaneously photoequalize one of said images with the other of said images and to mathematically determine a difference in gray scale values between one of said images and the other of said images on a picture cell by picture basis wherein one of the images has undergone image warp transformation and photo equalization with respect to the other so that the two picture cells are equivalent in image detail to one another, and means connected with said supervisory computer for producing a difference image in operator usable form from the difference values produced by said photo equalization and difference image processor.

5. A method for producing a difference image from related subjects represented on a first and a second image, wherein said first and second images are represented by digitally encoded values representative of gray scale values in a predetermined gray scale range for a plurality of picture cells into which each of said images is divided, said method performed on an apparatus comprised of a supervisory computer, a dot product processor connected to receive data from said supervisory computer, a square root and divide processor connected to receive data from said dot product processor and to transfer processed data to said supervisory computer, a photoequalization and difference image processor connected to receive data from said supervisory computer and to transfer processed data to said supervisory computer, first and second spatial transformation processors, each connected to receive data from said supervisory computer and to transfer processed data to said supervisory computer, a plurality of interpolation processors adapted to determine the gray scale values of transformed picture cells, at least one of said processors connected to receive data from said supervisory computer and at least one of said processors connected to transfer processed data to said supervisory computer, means connected with said supervisory computor for supplying encoded digital image data, means connected with said supervisory computer for providing mass memory storage capability, and means connected with said supervisory computer for producing a difference image in operator usable form, said method comprising the steps of:

a. initially, manually positioning the features on said images to obtain approximate correspondence of at least some major image features;
b. identifying at least four corresponding image control point pairs related to features appearing on both images and measuring the relative positions of said points;
c. calculating image warp values, for at least one of said images for determining the estimated location of plurality of match point pairs selected in a geometric pattern, based on the control point pairs determined in step (b);
d. assigning an image correlation value to an array of picture cells surrounding each of said geometrically selected match point pairs;
e. determining by successive calculations based on comparison of a plurality of relative displacements of each array the location producing the best correlation value to determine the precise location of each of said match point pairs;
f. using the precisely determined location of an initial group of match point pairs to determine the estimated location of additional match point pairs;
g. repeating steps f and e until the precise location of a predetermined number of match points is determined throughout the pair of images;
h. warping one image to achieve registration with the other based on the location of the match point pairs;
i. photoequalizing the gray scale information content of said images to achieve corresponding gray scale information content values for corresponding features of the images; and
j. producing a difference image from the pair of images by subtracting one image from the other.

6. A method for producing a difference image from related subjects represented on a first and second image, wherein said first and second images are represented by digitally encoded values representative of gray scale values in a predetermined gray scale range for a plurality of picture cells into which each of said images is divided, said method performed on an apparatus comprised of a supervisory computer, a dot product processor connected to receive data from said supervisory computer, a square root and divide processor connected to receive data from said dot product processor and to transfer processed data to said supervisory computer, a photoequalization and difference image processor connected to receive data from said supervisory computer and to transfer processed data to said supervisory computer, processing means for spatially transforming at least one of said images to achieve registration with the other by assigning a transformed location on the registered image for each picture cell in the original image, said means connected to receive data from said supervisory computer and to transfer processed data to said supervisory computer, processing means for interpolating the gray scale values of picture cells transformed by said spatial transformation processing means to determine the gray scale value of transformed picture cells from adjacent picture cell gray scale values in the original image, said processing means being connected to receive data from said supervisory computer and to transfer processed data to said supervisory computer, means connected with said supervisory computer for supplying encoded digital image data with respect to said first and second images, means connected with said supervisory computer for providing mass memory storage capability for storing gray scale values for picture cells in said first and second images during processing of data, and for said difference image, means connected with said supervisory computer for producing a difference image in operator usable form, said method comprising the steps of:

initially, obtaining a preliminary coarse positioning of the features on said images to obtain approximate correspondence of at least some major image features;

identifying at least four corresponding image control point pairs related to features appearing on both images and measuring the relative positions of said points;

calculating image warp values, for at least one of said images for determining the estimated location of plurality of match point pairs selected in geometric pattern, based on the control point pairs determined in the second step, assigning an image correlation value to an array of picture cells surrounding each of said geometrically selected match point pairs, determining by successive calculations based on comparison of a plurality of relative displacements of each array the location producing the best correlation value to determine the precise location of each of said match point pairs, using the precisely determined location of an initial group of match point pairs to determine the estimated location of additional match point pairs, repeating the fifth and sixth steps until the precise location of a predetermined number of match points is determined throughout the pair of images, warping one image to achieve registration with the other based on the location of the match point pairs, photoequalizing the gray scale information content of said images to achieve corresponding gray scale information content values for corresponding features of the images; and producing a difference image from the pair of images by subtracting one image from the other.

* * * * *